United States Patent [19]

Nisper

[11] 4,268,046
[45] May 19, 1981

[54] MULTIPLE SEAL STATIONARY SEALING RING

[75] Inventor: Kenneth J. Nisper, Muskegon, Mich.

[73] Assignee: Muskegon Piston Ring Company, Muskegon, Mich.

[21] Appl. No.: 14,737

[22] Filed: Feb. 23, 1979

[51] Int. Cl.³ .......................... F16J 9/06; F16L 21/02
[52] U.S. Cl. .................................... 277/139; 277/216; 277/160; 267/1.5; 285/141; 285/187; 285/338; 285/345
[58] Field of Search ............... 277/138, 139, 140, 156, 277/143, 218, 216, 222, 207 R, 207 A, 160, 3, 27; 267/1.5; 285/231, 345, 108, 95, 109, 138, 139, 122, 123, 141, 187, 338, DIG. 1, DIG. 4, DIG. 5, DIG. 18

[56] References Cited

U.S. PATENT DOCUMENTS

| | | | |
|---|---|---|---|
| 2,293,450 | 8/1942 | Wilkening | 267/1.5 |
| 2,319,543 | 5/1943 | Hall | 277/28 |
| 2,535,597 | 12/1950 | Phillips | 267/1.5 |
| 2,656,230 | 10/1953 | Phillips | 277/139 |
| 2,854,301 | 9/1958 | Lutz | 267/1.5 |
| 2,891,831 | 6/1959 | Baker | 267/1.5 X |
| 2,931,671 | 4/1960 | Beeley | 277/207 A X |
| 2,970,022 | 1/1961 | Anderson | 277/139 |
| 3,263,912 | 8/1966 | Frenzel | 277/138 |
| 3,326,561 | 6/1967 | Braendel | 277/138 X |
| 3,370,858 | 2/1968 | Braendel | 267/1.5 X |
| 4,099,730 | 7/1978 | Nisper | 277/218 X |
| 4,101,148 | 7/1978 | Lee | 277/3 X |
| 4,109,924 | 8/1978 | Stucke | 277/218 X |

FOREIGN PATENT DOCUMENTS

| | | | |
|---|---|---|---|
| 907089 | 8/1972 | Canada | 277/218 |
| 888513 | 9/1943 | France | 285/95 |
| 512360 | 9/1939 | United Kingdom | 277/143 |
| 899964 | 6/1962 | United Kingdom | 285/231 |

Primary Examiner—Robert S. Ward, Jr.
Attorney, Agent, or Firm—Price, Heneveld, Huizenga & Cooper

[57] ABSTRACT

A stationary sealing ring adapted to seal a grooved carrier and a circular housing is disclosed. The sealing ring includes a plurality of stacked, annular parted ring segments dimensioned to slip within the carrier groove and an expander which exerts a radial force on an inner face of each of the segments. The expander is configured to be spaced from the bottom of the groove under operating conditions.

18 Claims, 8 Drawing Figures

MULTIPLE SEAL STATIONARY SEALING RING

BACKGROUND OF THE INVENTION

The present invention relates to stationary seals and more particularly to a unique multiple seal type stationary sealing ring.

Various forms of sealing arrangements have heretofore been proposed for use in generally nonrotating, nonreciprocating, or stationary applications. One form of such seal is the so called multiple seal or Multiseal type sealing ring sold under the trademark Multiseal. This ring has been employed for essentially low temperature applications such as those wherein the operating conditions are less than 250° F. Such a ring includes a plurality of stacked, annular split ring segments having overlapping ends and an expander. The expander acts against the segments each of which forms a seal with a surface. Heretofore, the expander employed with such rings has been a radially corrigated, wavy or hump type expander. The segments have typically been fabricated from a high carbon steel which is acceptable for the typical low temperature environment.

The multiple seal ring effects a seal between one part which is typically designated a carrier and has a ring groove formed therein and another part which overlaps the carrier, is generally circular in section and which is typically referred to as a housing. The ring groove formed in the carrier typically has upper and lower sides and a bottom or generally cylindrical wall. The parted segments are disposed within the carrier groove and the expander engages the ring groove bottom and biases the segments into engagement with the inner circumference of the housing. A multiple seal type stationary sealing ring possesses certain inherent design advantages primarily related to compactness, ease of assembly and reduced manufacturing costs which makes it particularly desirable.

In typical high temperature applications, such as in turbines, exhaust systems and the like, the heretofore available multiple seal rings have not been usable. The operating temperatures in such applications may vary from 300° F. to 1600° F. The high carbon steel which has been employed to fabricate the split segments and the wavy expander oxidizes at the high temperatures. This results in the segments sticking together and sticking to the sides of the carrier groove. Such sticking makes the seal essentially inoperative to properly seal the two to three atmospheres of pressure existing in such environments. Further, in such environments the carrier part is typically subjected to significantly higher temperatures than the housing part. The parts and the ring, due to the temperature differences, will expand at different rates. A sealing ring used in such applications must be able to accommodate this difference in thermal expansion. As a result of these problems, bellows type face seals, for example, have been employed. These seals are relatively expensive and bulky which presents problems for the turbine and exhaust system designer.

Merely changing the material employed to fabricate the segments and the expander of the previous multiple seal type sealing ring does not adapt this ring for use in such high temperature environments. In order to operate, the wavy expander must contact the bottom of the groove. As the carrier expands and the temperature reaches operating conditions, the wavy spring or expander takes a substantial set and fails for lack of tension. The expansion of the parts reduces the compressed height of the expander at operating conditions, raises stress levels and an excessive set typically occurs. This set reduces the radial tension exerted on the segments at operating temperature and thereby reduced the effectiveness of the sealing ring.

SUMMARY OF THE INVENTION

A need, therefore, exists for a compact, stationary seal usable in high temperature environments of the 300° F. to 1600° F. range whereby the problems heretofore experienced are substantially eliminated. Essentially, the unique multiseal stationary sealing ring in accordance with the present invention includes a plurality of stacked, annular parted ring segments dimensioned to slip within a carrier groove. A circumferential expander means is provided for exerting a radial force on each of the segments to bias the segments into sealing engagement with a housing inner circumferential surface. The expander means is configured to be spaced from the bottom of the groove defined by the carrier to thereby eliminate problems relating to reduction in radial tension upon thermal expansion of the mating parts.

In narrower aspects of the invention, the segments and the expander are fabricated from a high temperature material. In one embodiment, the expander is of the type which includes a plurality of axially directed undulations as shown, for example, in U.S. Pat. No. 2,854,301, entitled PISTON RING EXPANDER AND METHOD OF FORMING SAME and issued on Sept. 30, 1958, to Lutz. The undulations alternately extend between the upper and lower sides of the groove. In another embodiment, the expander comprises a parted ring body having a group of circumferentially spaced strut sections with adjacent pairs of the strut sections joined by two rows of connectors. The connectors are bent inwardly towards one another to form a second group of sections and one of the groups of sections is arranged for radial engagement with the parted segments.

The circumferential expander is preferably dimensioned so that it exerts a given maximum unit pressure on the segments at operating temperature which is greater than at ambient temperature. The circumferential expander increases in circumferential length as the temperature increases from ambient to operating temperature. The lower tension necessary at ambient conditions can be obtained, therefore, from a shorter circumferential length expander which in turn facilitates installation.

The high temperature sealing ring in accordance with the present invention is compact in size, easily and readily manufactured employing conventional materials, is easily installed and readily accommodates the difference in thermal expansion of the mating parts of the seal.

Figure 7:
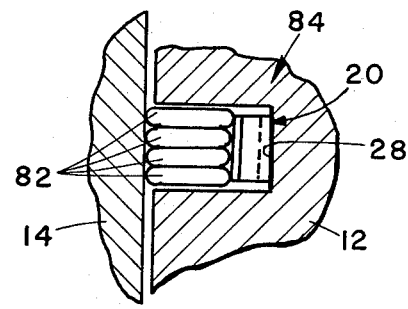

IFG. 6 is a plan view of a prior art stationary sealing ring;

FIG. 7 is a fragmentary, sectional view of a prior art seal; and

Figure 8:
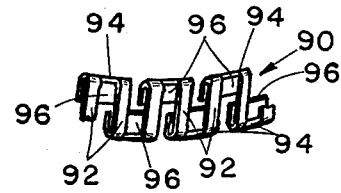

FIG. 8 is a fragmentary, perspective view of an alternative expander usable with the present invention.

DETAILED DESCRIPTION OF THE PREFERRED EMBODIMENT

Figure 1:
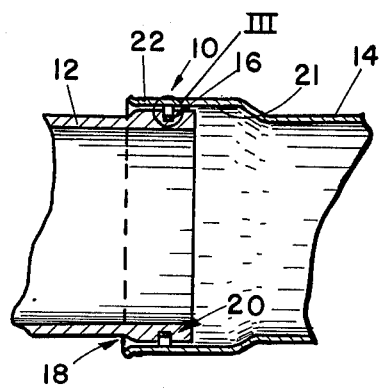
FIG. 1 is an elevational view in section of a high temperature seal and joint in accordance with the present invention.

A preferred embodiment of a seal in accordance with the present invention is illustrated in FIG. 1 and generally designated 10. Seal 10 includes a carrier 12, a housing 14, and a high temperature multiple seal stationary sealing ring 16. Carrier 12 slips into a housing 14 and these parts overlap in a telescoping relationship. Parts 12 and 14 are essentially stationary with respect to each other. The seal illustrated in FIG. 1 is between a diesel engine exhaust manifold and a turbocharger housing or inlet pipe. Carrier 12 is defined by a portion of the exhaust manifold of the diesel and housing 14 is defined by a portion of the turbocharger. Carrier 12 includes an upended end portion 18 which defines a circumferentially positioned, annular groove 20. Groove 20 opens outwardly towards an inner circumferential surface or face 21 of an upended portion 22 of housing 14. Both carrier 12 and housing 14 are generally cylindrical in shape. Sealing ring 16 effectuates a seal at the joint defined by the carrier 12 and housing 14. In the environment of the embodiment illustrated, exhaust gases at a temperature of approximately 1300° F. pass through the carrier 12 and into the housing 14. Sealing ring 16 accommodates the difference in thermal expansion of carrier 12 and housing 14 and the limited relative movement between these parts.

Figure 3:
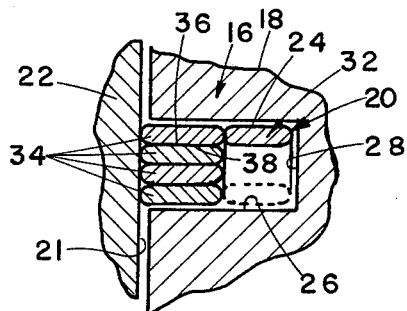
FIG. 3 is an enlarged, fragmentary, cross sectional view of the circled portion designated III in FIG. 1 with the groove defined by the carrier and with the housing rotated counter-clockwise through an angle of 90° from the orientation of FIG. 1.

As best seen in FIG. 3, groove 20 includes an upper side 24, a lower side 26 and a bottom or cylindrical wall 28. The outer circumference of upended portion 18 is spaced slightly from inner circumferential face 21 of the housing portion 22. The high temperature multiple seal stationary sealing ring 16 is disposed within groove 20 and extends axially between opposed sides 24, 26.

Figure 4:
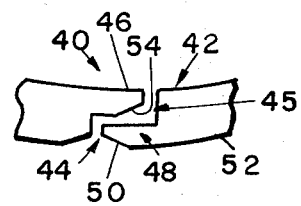
FIG. 4 is an enlarged, fragmentary, plan view of the end gap of a split rail segment incorporated in the present invention.

In the preferred embodiment, sealing ring 16 includes an expander 32 and a plurality of stacked, annular, generally flat split or segmented rails 34. In the preferred embodiment of the ring 16, four such split rail segments 34 are employed. Each of the segments 34 is positioned so that a lower side 36 slides on an upper side 38 of the next adjacent segment 34. Segments 34 are stacked one upon the other and each segment, as seen in FIG. 4, includes opposed ends 40, 42 which define ring gaps 44, 45. In the preferred embodiment, end 40 includes a projection 46 which extends circumferentially. End 42 includes a circumferentially extending projection 48 extending in opposed relationship to projection 46. Projection 48 on end 42 is slightly beveled at 50 along its outer radial edge 52. Projection 46 includes a beveled or angled edge 54 along its outer radial edge. The projections are matingly configured to permit overlapping of the ends 40, 42 of split rail segment 34. The end gaps are necessary to accommodate the thermal expansion of the ring segments.

Figure 2:
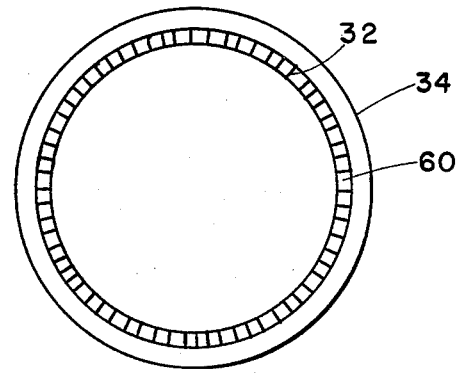
FIG. 2 is a plan view of a high temperature multiple seal stationary sealing ring in accordance with the present invention.
Figure 5:
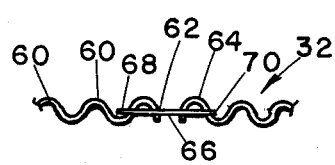
FIG. 5 is a fragmentary side elevational view of an expander employed in the present invention.

As best seen in FIGS. 2, 3 and 5, expander 32 is of the equalizer type and includes a plurality of axially extending, equally dimensioned and symmetrical undulations 60. Undulations 60 extend axially equal distances above and below the circumferential centerline of the expander 32, between sides 24, 26 and, therefore, axially with respect to the groove, the carrier and the housing. The overall axial dimension of the expander 32 is less than the total distance between the opposed sides 24, 26 of groove 20. Expander 32 exerts a radial force on each of the split rail segments 34 by circumferential expansion and contraction.

As seen in FIG. 3, the overall radial width of ring 16 including the segments 34 and the expander 32, is selected so that the expander does not engage bottom 28 of the ring groove 20. This feature and the circumferential nature of the expansive forces generated, permits ring 16 to be usable in the high temperature applications.

As seen in FIG. 5, it is presently preferred that the opposed ends 62, 64 of the expander 32 by pinned together. The ends are drilled to form suitable apertures through which a pin 66 passes. Pin 66 is retained in the expander by crimping ends 68, 70 thereof. When installed in carrier groove 20, the segments 34 engage the outer face of the expander and the opposed ends of the expander are brought into abutting relationship, as seen in FIG. 2. The expander is compressed circumferentially thereby causing the expander to exert a radial outward force on the segments 34.

The exhaust system seal illustrated must be capable of operating efficiently at the temperatures experienced. The operating temperature of the exhaust gas seal in a diesel application is on the order of 1300° F. The temperatures at these operating conditions are too high for carbon steel from which prior stationary seal rings have been fabricated. At these elevated temperatures, the carbon steel oxidizes causing the segments to stick together and to the sides of the grooves. Further, as discussed more fully below, the prior expanders which have been used with multiple seal sealing rings are under stress and will take a substantial set at these operating temperatures resulting in failure due to lack of tension.

In order to function properly at the elevated temperatures experienced in exhaust systems and in turbine applications, ring 16 must be fabricated from a heat resisting material possessing excellent oxidization resistance and general corrosion resistance. It is presently preferred that a nickel based heat resisting alloy of which a large number are commercially available be employed to fabricate both the segments 34 and the expander 32. The material should retain its mechanical properties at the high temperatures reached. One such nickel based heat resisting alloy which is presently preferred is that sold under the trade name Rene 41. Other materials possessing the desired mechanical properties at the operating temperatures experienced could of course be used.

In configuring expander 32 employed in the ring of the present invention, the variation of tension of the expander due to thermal expansion must be considered. Since expander 32 is disposed in carrier 12 which is closest to the high temperature gas, it will operate at a temperature higher than the housing 14 and therefore expand at a greater rate than the housing. As a result, the tension or radial force generated by the expander increases from ambient to operating conditions. The expander is configured and dimensioned to provide a given unit pressure under operating conditions and a lower unit pressure under ambient conditions. The expander will thermally expand or lengthen upon an increase in temperature to provide this given unit pressure. A shorter expander length or circumference may be used than would be required for a given unit pressure if the temperature effects were not considered. This shorter circumferential length greatly facilitates installation.

Figure 6:
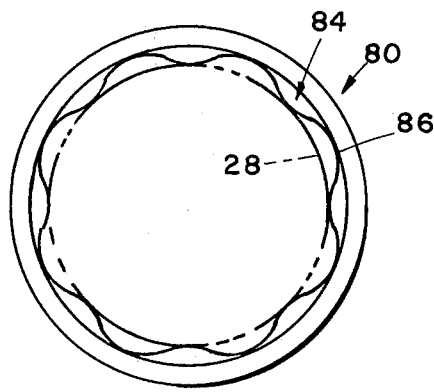

The advantages of the present invention are readily apparent from a comparison with a prior ring. As shown in FIGS. 6 and 7, a prior ring 80 includes a plurality of stacked segments 82 and a polygonal, wavy or hump-back expander 84. The hump-back expander 84 has a radially corrigated configuration when viewed in plan (FIG. 6) and includes a plurality of radial undulations 86. As seen in FIG. 7, expander 84 engages the bottom 28 of the piston ring groove 20 and exerts a radial force on the segments 82. At the high temperatures experienced in exhaust systems and gas turbine environments, for example, the difference in the thermal expansion rates of the carrier 12, the housing 14 and the expander result in the polygonal type expander 84 taking a permanent set due to its bottoming against the bottom wall 28 of the groove. Even with the proper material selection at these higher temperatures, due to the different coefficients of expansion and the different temperatures experienced, the compressed height or radial width dimension, as viewed in FIG. 7, of expander 84 is significantly reduced. This reduction in compressed height raises the stress level in expander 84 to the point where an excessive set occurs. This excessive set of the expander in turn reduces the effectiveness of the seal at operating conditions.

With the sealing ring in accordance with the present invention using the expander 32, spring bottoming in the groove is not present and overstressing of the spring does not occur. As is clear from FIG. 3, expander 32 does not bottom in the groove and the stresses are less under all conditions than with a hump type or polygonal type expander. As a result, the ring in accordance with the present invention will lose less tension at operating conditions and operate substantially more efficiently than a multiple seal ring employing a hump type spring.

Although the sealing ring in accordance with the present invention overcomes problems which have been experienced primarily in high temperature applications, the present invention provides significant advantages in low temperature applications as well. In large diameter applications, a hump type or wavy form spring 84 can be compressed severely on one side and damaged if the body or carrier holding the multiseal is eccentric with the housing. With a circumferential type expander, bottoming does not occur and damage to the spring cannot happen. The seal in accordance with the present invention provides significant operating advantages over the prior available rings used in stationary applications. Other advantages relate to compactness of the design of the seal and reduced costs of manufacture. For example, in certain turbine applications, due to the high temperatures experienced and the differences in thermal expansion it was felt necessary to employ a bellows type face seal. A bellows type seal is significantly more expensive and requires significantly more space than the sealing ring in accordance with the present invention.

A sealing ring in accordance with the present invention for use with a power turbine has been developed which has an outer diameter of 29.4 inches and an axial dimension of 0.184 inches. Each of the four segments 34 has a transverse or radial width or wall of 0.367 inches and an axial thickness of 0.0460 inches. The expander 32 is fabricated with 320 undulations or loops and has a transverse width or radial wall of 0.252 inches before forming and an axial thickness of 0.046 inches. The overall axial height of the expander 32 is approximately 0.186 inches. Groove 20 formed in the carrier 14 of this application has a height dimension between the opposed faces or sides 24, 26 of 0.191 inches. The groove depth is approximately 0.6725 inches. The gauge gaps 44, 45 of each segment are approximately 0.630 inches. The gaps provide sufficient clearance to accommodate thermal expansion of the segments at operating conditions. The projections 46, 48 have a circumferential dimension of approximately 1.255 inches. The minimum transverse thickness of each projection is on the order of 0.178 to 0.188 inches.

While the preferred embodiment uses a circumferential expander having axial undulations, other circumferential expanders could be employed. The primary requirements are that the expander exert a fairly equal force on each segment and that the expander does not bottom in the carrier groove. For example, a circumferential expander as illustrated in U.S. Pat. No. 4,099,730, entitled PISTON RING CONSTRUCTION, and issued on July 11, 1978, in the name of the present inventor could be used in the sealing ring in accordance with the present invention. Such an expander is illustrated in FIG. 8 and generally designated 90. Expander 90 is formed from a parted blank into an annular shape and which includes a group of circumferentially-spaced strut sections 92. Two rows of connectors 94 integrally join the ends of adjacent pairs of strut sections. Connectors 94 have portions 96 bent inwardly towards one another so that the connectors of one row are in a staggered relation with respect to connectors of the other row. The rows of connectors form a second group of sections and portions 96 of the connector sections are radially spaced from portions of the strut sections 92. One of the groups of sections is arranged for radial engagement with the ring segments. In the embodiment shown, the struts 92 would engage the segments. Expander 90, as illustrated and described in U.S. Pat. No. 4,099,730, will function to exert a radial tension on each of the segments 32, operates by circumferential expansion and therefore does not bottom in the groove 20. The disclosure of U.S. Pat. No. 4,099,730 is hereby incorporated by reference.

In view of the foregoing description of the preferred embodiment of the present invention, it should now be readily apparent to those of ordinary skill in the art that the various elements co-act in such a manner to provide specified advantages heretofore not obtainable. The sealing ring operates efficiently and effectively at high temperatures and is easily manufactured employing conventional techniques from readily available materials. The ring and resulting seal are easily assembled and require less space than the sealing structures previously used in high temperature environments.

Various modifications of the type discussed above may undoubtedly be made which would not depart from the inventive concepts disclosed. It is expressly intended, therefore, that the above description should be considered as that of the preferred embodiment. The true spirit and scope of the present invention may be determined by reference to the appended claims.

The embodiments of the invention in which an exclusive property or privilege is claimed are defined as follows:

1. A high temperature multiple seal stationary sealing ring adapted to form a seal between a carrier and a circular housing; the carrier including a ring groove having an upper side, a lower side and a bottom, said sealing ring being disposable within said groove and comprising:
   a plurality of stacked, annular, parted ring segments dimensioned to slip within the carrier groove, each segment having an outer face and an inner face; and
   a circumferential expander means for exerting a radial force on the inner face of each of said segments, said expander means being configured to be spaced from the groove bottom at the operating temperature of the carrier and housing, said segments and said expander means being fabricated from a high temperature alloy which maintains its mechanical properties in the temperature range of 300° F. to 1600° F. and said radial force increasing as temperature increases to said operating temperature.

2. A high temperature multiple seal stationary sealing ring as defined by claim 1 wherein said expander means comprises a strip of metal having axially directed undulations, said expander being dimensioned to exert a given unit pressure on the segments at operating temperature which is greater than at ambient temperature.

3. A high temperature multiple seal stationary sealing ring as defined by claim 2 wherein said strip of metal is formed into a generally circular shape and includes opposed ends and wherein said ring further includes a pin extending through the opposed ends of said expander.

4. A high temperature multiple seal stationary sealing ring as defined by claim 1 wherein said expander means comprises a parted ring body having a group of circumferentially spaced strut sections with adjacent pairs of strut sections being joined by two rows of connectors, the connectors being bent inwardly towards one another to form a second group of sections, one of said groups of sections being arranged for radial engagement with the segments.

5. A high temperature joint, comprising:
   a generally cylindrical carrier defining a groove opening through a wall of said carrier, said groove including opposed sides and a bottom;
   a housing having a surface disposed in opposed, spaced relationship to said groove; and
   a stationary sealing ring means disposed within said groove for defining a multiple seal with the cylindrical surface of said housing, said carrier having an operating temperature higher than the operating temperature of said housing, said ring means including:
   a circumferential expander disposed within said groove, said expander having an annular configuration in plan and including an outer radial face and an inner radial face, said inner radial face being dimensioned and configured to be spaced from said groove bottom when said carrier is at its operating temperature; and
   a plurality of annular split rail segments disposed within said groove, each segment having an inner face and an outer face, the inner face of each of said segments engaging the outer radial face of said expander, said expander exerting a radial force on each of said segments thereby biasing the outer face of each segment into sealing engagement with said housing surface whereby as said carrier reaches its operating temperature, said expander will thermally expand and bias said segments towards said housing surface with an increasing pressure until a predetermined unit pressure is reached and wherein said expander and said segments are formed from a high temperature alloy which maintains its mechanical properties in the temperature range of 300° F. to 1600° F.

6. A high temperature joint as defined by claim 5 wherein said expander comprises a generally circular length of metal having a plurality of axially directed, equally dimensioned undulations.

7. A high temperature joint as defined by claim 6 wherein said expander includes opposed ends and a pin extending through said ends.

8. A high temperature joints as defined by claim 7 wherein each of said segments includes opposed ends, each of said ends including opposed circumferentially extending projections matingly configured to define end gaps.

9. A high temperature joint as defined by claim 5 wherein said circumferential expander comprises a parted ring body having a group of circumferentially spaced strut sections with adjacent pairs of strut sections being joined by two rows of connectors, the connectors being bent inwardly towards one another to form a second group of sections, one of said groups of sections being arranged for radial engagement with the segments.

10. A high temperature joint as defined by claim 9 wherein each of said segments includes opposed ends, each of said ends including opposed circumferentially extending projections matingly configured to define end gaps.

11. A high temperature joint as defined by claim 8 wherein said segments and said expander are fabricated from a high temperature nickel base alloy.

12. A high temperature joint as defined by claim 11 wherein said segments and said expander are fabricated from a high temperature nickel base alloy.

13. A method of sealing a space defined by a generally cylindrical carrier disposed within a generally cylindrical housing, said carrier having a groove opening towards an inner circumferential surface of said housing, said groove including opposed sides and a bottom, and said housing and said carrier being essentially stationary, said method comprising the steps of:
   installing a circumferential expander within said groove, said expander being fabricated from a high temperature nickel alloy and being dimensioned so as to be spaced from the bottom of said groove at the operating temperature of the carrier;
   stacking a plurality of annular split rail segments one upon the other; and
   placing said stacked segments within said groove so that said segments are engaged by an outer radial face of said expander and biased radially outwardly into sealing engagement with the inner circumferential surface of said housing.

14. A method as defined by claim 13 wherein said circumferential expander is an elongated strip having a plurality of axially extending undulations.

15. A method as defined by claim 14 further including the step of pinning opposed ends of said expander.

16. A method as defined by claim 15 wherein said segments and said expander are fabricated from a high temperature alloy.

17. A method as defined by claim 16 wherein four segments are stacked one upon the other.

18. A method as defined by claim 13 wherein said circumferential expander is a parted ring body having a group of circumferentially spaced strut sections with adjacent pairs of strut sections being joined by two rows of connectors, the connectors being bent inwardly towards one another to form a second group of sections, one of said groups of sections being arranged for radial engagement with the annular split rail segments.

* * * * *